United States Patent [19]
Sahramaa

[11] Patent Number: 5,839,848
[45] Date of Patent: Nov. 24, 1998

[54] JOINING METAL MEMBERS

[76] Inventor: Kimmo J Sahramaa, 11301 S. Shore Rd., Reston, Va. 22090

[21] Appl. No.: 777,036

[22] Filed: Dec. 30, 1996

[51] Int. Cl.[6] .............................. F16B 21/00; F16B 7/04
[52] U.S. Cl. ......................... 403/282; 403/280; 403/274
[58] Field of Search ................................. 403/282, 285, 403/284, 280, 277, 276, 274

[56] References Cited

U.S. PATENT DOCUMENTS

| | | |
|---|---|---|
| 1,441,394 | 1/1923 | Blye . |
| 1,656,856 | 1/1928 | Gagnon ............................. 403/282 X |
| 1,976,019 | 10/1934 | Heim . |
| 3,082,850 | 3/1963 | Weening . |
| 3,776,652 | 12/1973 | Sanderson ............................. 403/282 |
| 3,999,352 | 12/1976 | Doke ................................. 403/282 X |
| 4,021,988 | 5/1977 | Edeus et al. . |
| 4,652,169 | 3/1987 | Matthews ........................... 403/282 X |
| 4,982,545 | 1/1991 | Stromback ............................... 52/639 |
| 5,335,411 | 8/1994 | Muller et al. ...................... 403/282 X |
| 5,520,475 | 5/1996 | Coolman et al. . |
| 5,595,453 | 1/1997 | Nattel et al. ....................... 403/282 X |

*Primary Examiner*—Anthony Knight
*Attorney, Agent, or Firm*—A. David Pellinen

[57] ABSTRACT

Metal members are joined to each other by the use of depending collars and through holes. A tool head inserted through the collars and holes and the tool shoulder exert pressure to simultaneously bend and crimp the collar. This technique can also be applied to truss members or to tracks and studs so that the members are easily joined or attached to each other. Beveled ends facilitate the alignment of collars with the holes.

18 Claims, 4 Drawing Sheets

JOINING METAL MEMBERS

BACKGROUND OF THE INVENTION

Studs, tracks and metal members are finding widespread use in the construction industry and particularly as part of steel frame panel systems. To join metal members together use is generally made of self tapping screws, nuts and bolts or, for example, clinch pressing. An object of this invention is to improve the way metal members are joined or attached to one another. Another object is to have a single connecting point which provides diagonal rigidity.

It would be desirable to have metal pieces prefabricated with prepositioned holes and collars to eliminate or lessen the need of manual work at a frame panel assembly station where fabrication takes place, or at a site, thereby reducing the cost.

SUMMARY OF THE INVENTION

Prepunched holes on metal members surround collars on adjoining metal members. A tool head, inserted through both members, pulls on the collar of one member to bend the collar against the other member and a tool shoulder. The force of the tool bends and crimps the collar tightly with the result that the members are connected, fastened or joined together in a rigid manner.

The member can be in a C-shape or U-shape or other structural shapes and of various thicknesses or gauges, and are applicable to tracks and studs and metal plates in general. In an automated manufacturing process frames and trusses can be easily prefabricated. A single crimped connection point gives diagonal rigidity to joined members.

DETAILED DESCRIPTION OF THE INVENTION

Figure 1:
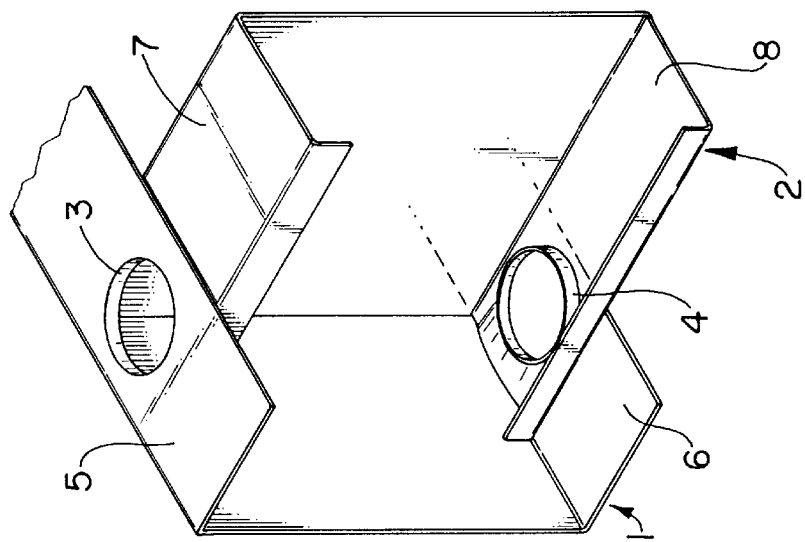
FIG. 1 is a perspective view of two sheet metal pieces prior to being joined.

Referring to FIG. 1 the metal track in the form of a U-shape member 1 with a web and flanges 5 and 6 to be joined to a metal stud in the form of a C-shape member 2, as is standard in the industry, having flanges 7 and 8. The members 1 and 2 have several different terms in the art such as member, plate, stud, track or formed shape. The attachment could also be made between plates, one plate corresponding to flange 6 and the other plate corresponding to flange 8. Two through holes in flanges 7 and 8 surround collars 3, 4 depending inwardly from flanges 5 and 6. A suitable tool head is inserted through track 1 into the interior of stud 2, and is brought to bear against the collars and bends and crimps the collars against the stud 2. An advantage of the invention is that inserting the tool in this manner makes access easier from the outside of the member or any member structure than if the tool head had to fed from the behind the connection point in some other manner. This makes it easier to join two members anywhere at any connecting point in a metal construction system. This is important for an automated system forming frame panels or trusses in formed shape building construction systems.

The technique for joining members 1 and 2 can be applied to any member, plate, stud, track, or any formed metal shape. Indeed the attachment could also be made between two strips of metal without flanges. The C-shaped member could be a top chord, a bottom chord, or a web member in a prefabricated truss. The top chord could serve as a roof rafter while the bottom chord could serve as a ceiling joist. The stud car be a wall stud or any vertical stud. When extending only a part of the vertical height such vertical studs are referred to as a jack stud or cripple stud.

Figure 2:
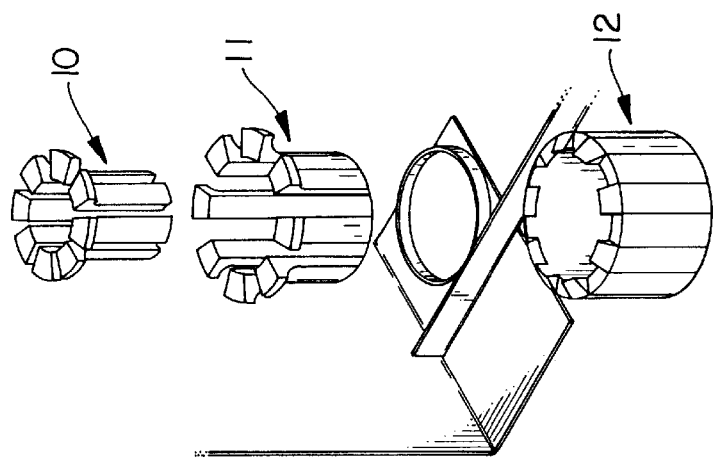
FIG. 2 is an exploded view of a part of the tool used to join the pieces.

FIG. 2 is an exploded view of a part of the tool used to bend and crimp the collar. From the bottom., as viewed in FIG. 2, a tool head is inserted through the hole and collar in a compressed form as shown at 10. After passing completely through the hole and collar it is expanded as shown at 11. The tool head is brought to bear against the collar while the flange of the track is in contact with tool shoulder 12. The tool head bears against the collar and bends the collar while at the same time a crimping action takes place at the tool shoulder. A similar operation takes place at the other flange of the track 1. Thus the tool head and shoulder constitute tool means to join the members together. Viewing FIGS. 1 and 2 it would be very difficult to insert a tool from the left or right part of stud 2. Using the tool shown secures access from the outside of the member and connection point by passing through the aligned hole and collar.

Figure 3:
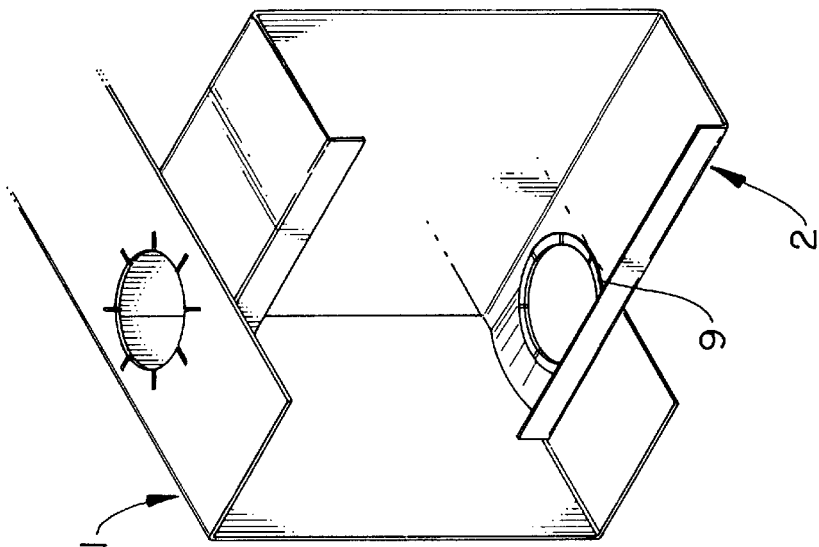
FIG. 3 is a perspective view of the two plates joined together.

As seen in FIG. 3 the collar is bent or crimped at 9 thereby Joining a flange of track 1 to a flange of stud 2 at this single connecting point. The action of the tool against the collars causes them to be bent and crimped to form the joint thus providing diagonal rigidity to the mechanical connection. While FIGS. 1 and 3 show track 1 with the depending collars and the stud with the holes it is evident that either kind of plate could have a collar or a through hole.

Figure 4:
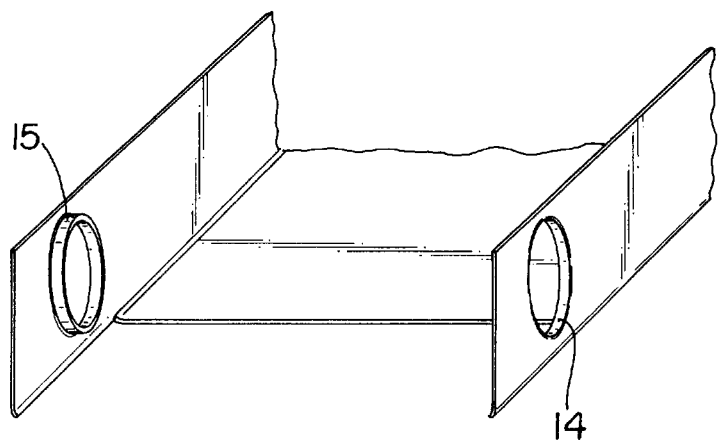
FIG. 4 is a perspective view of a track member using the invention.

Other types of plates or members can have the same configuration of collars and holes. FIG. 4 shows a U track with collars 14, 15 depending inwardly thereof, and with the web partially cut as is common with a sill track and head track. Indeed the invention is applicable wherever metal pieces have to be joined such as in window or door openings where there are head tracks, sill tracks, vertical studs, and jamb studs.

Figure 5:
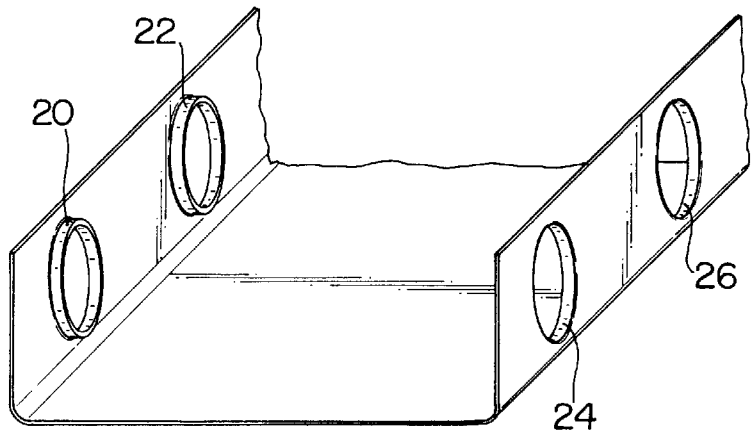
FIG. 5 is a perspective view of multiple collars on each leg of a member.

FIG. 5 shows a track with four collars 20, 22, 24 and 26 depending inwardly, two on each flange of the track. Of course there could be any number of collars in any location of a metal member.

Figure 6:
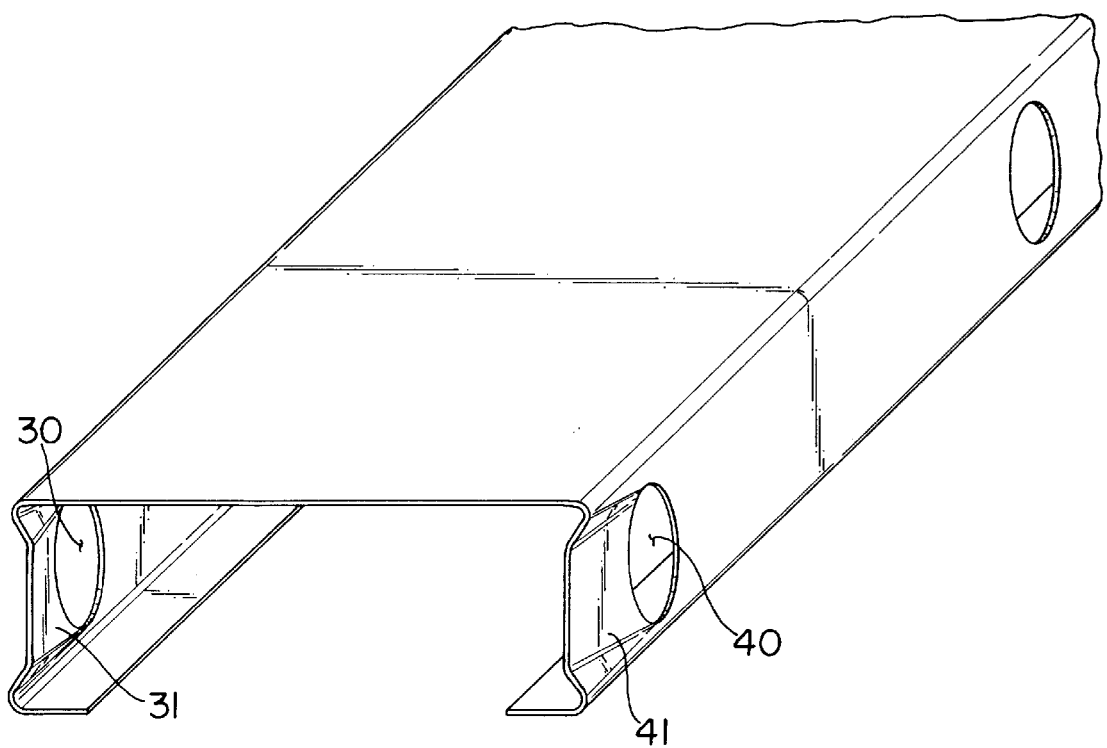
FIG. 6 shows the use of beveled ends with through holes.

FIG. 6 shows yet another embodiment of the invention. A metal stud has two through holes 30, 40. The ends of the stud have bevels 31 and 41 tapering from holes 30, 40, respectively, to the ends of the flanges. The bevels serve to facilitate alignment of the through holes with the collars.

Figure 7:
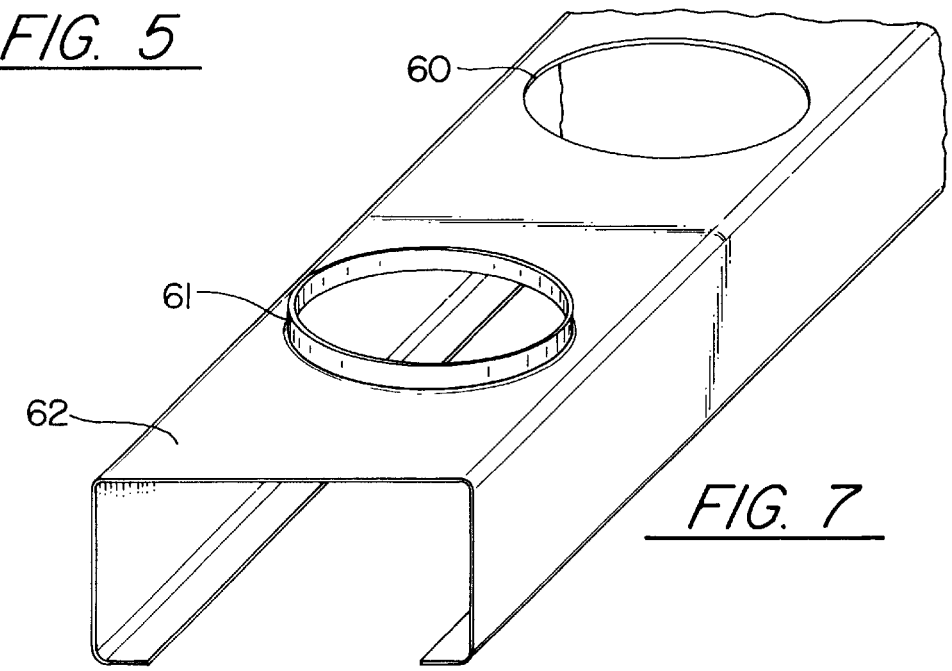
FIG. 7 is a perspective view of another metal member having both collars and through holes.

FIG. 7 shows the invention applied to a member such as is commonly used in a roof truss. This figure shows both a through hole 60 and a collar 61 in web 62. The web 62 could have only collars when back to back with other members having only through holes in alignment with the collars as is the case in commonly built trusses and would be applied to top and bottom chords, truss-web members, ceiling joists, or roof rafters. In this kind of member assembly applications they generally have webs that are back to back. Again the same tool means is used to join the members.

Figure 8:
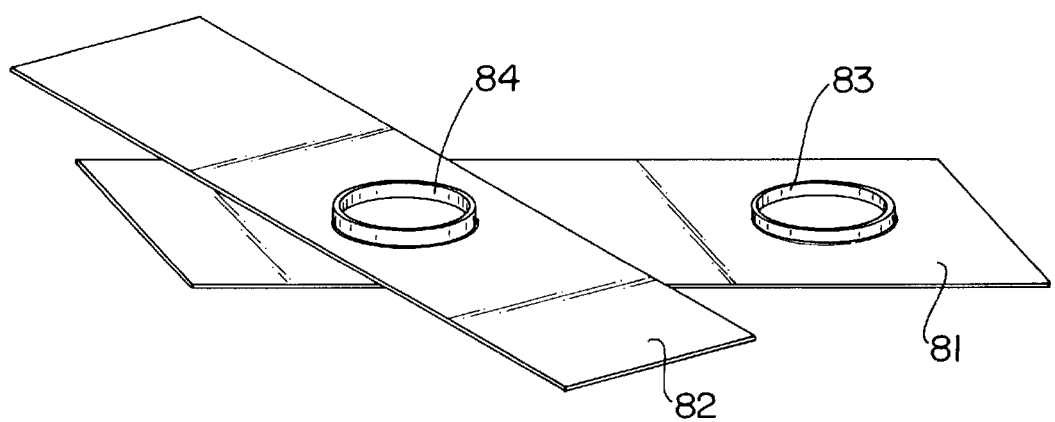
FIG. 8 is a perspective view of two metal strips offset with respect to each other.

FIG. 8 shows the invention applied to two metal members. Here the members are metal strips. Strip 81 has collars 83, 84 while strip 82 has a hole through which collar 84 extends prior to being bent. The two strips are offset or diagonally placed with respect to each other. The angle the strips are offset relative to each other can vary widely.

Figure 9:
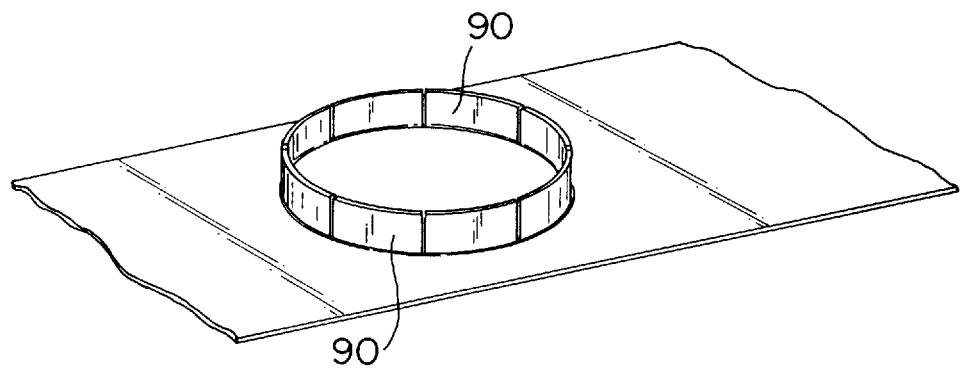
FIG. 9 is a perspective view of a slit collar used in the invention.

The collars in FIGS. 1–8 use solid collars. However there are other collar variations possible. FIG. 9 is a perspective view of a slit collar used in the invention. As shown a series of vertical cuts 90 are spaced around the periphery of the collar. The number of slits depends on the thickness of the members involved as well as the height of the collar as these parameters will determine the force necessary to bend and crimp the collar as well as the strength of the resulting connection of the joined members.

Figure 10:
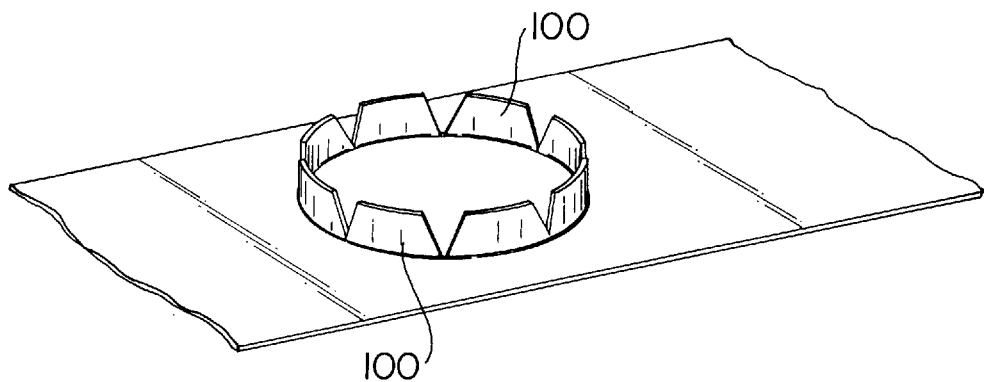
FIG. 10 is a perspective view of a v-cut collar used in the invention.

FIG. 10 is a perspective view of a v-cut collar used in the invention. As shown a series of v-cuts 100 are spaced around the periphery of the collar. Similar to FIG. 9 the number of v-cuts in FIG. 10 depends on the thickness of the members involved as well as the height of the collar as these parameters will determine the force necessary to bend and crimp the collar as well as the strength of the resulting connection of the joined members.

The invention finds particular utility in the manufacture of prefabricated frames and trusses. The sizes of frames and trusses can be incorporated in an automated manufacturing process using the crimping tool to manufacture any desired size frame or truss. Heretofore making frames and trusses on site by cutting, sawing, and then using rivets, screws, bolts, or welding, to fasten metal members together is labor intensive. The use of the disclosed collars and through holes in an automated process saves material and labor. The tool can be used at any connection point in the member structure and the number of heads and shoulders the tool means is obviously a design matter.

I claim:

1. An interconnected assembly of formed metal members in frame structures comprising:

first and second members;

said first member having at least a first preformed hole;

said second member having at least a first preformed collar;

said hole surrounds said collar; and said collar being bent onto said first member whereby said first and second members are fastened together.

2. The invention of claim 1 wherein one of said members is C-shaped.

3. The invention of claim 1 wherein one of said members is U-shaped.

4. The invention of claim 1 wherein one of said members is a C-shaped stud and the other member is a U-shaped track.

5. The invention of claim 1 wherein said first member is a first metal strip and said second member is a second strip and said first strip is offset with respect to said second strip.

6. The invention of claim 1 wherein both of said members are C-shaped.

7. The invention of claim 1 wherein first member has a second hole;

said second member has a second collar;

said second hole surrounds said second collar; and said second collar being bent onto said first member.

8. The invention of claim 7 wherein said first member is a C-shaped stud and said second member is a U-shaped track.

9. The invention of claim 1 wherein said first member has a bevel extending from end of said hole thereby enhancing the insertion of said collar into hole.

10. The invention of claim 7 wherein said first member has a bevel extending from opposite ends of said member to each of said first and second holes thereby enhancing the insertion of said collars into said holes.

11. The invention of claim 7 wherein said first member defines a web and first and second flanges extending from opposite ends of said web;

said first hole is on said first flange and said second hope is on said second flange.

12. The invention of claim 7 wherein said first member defines a web and first and second flanges extending from opposite ends of said web;

said first hole is on said first flange and said second hole is on said second flange; and a bevel extends from the ends of each of said flanges to said holes thereby enhancing the insertion of said collars into said holes.

13. An interconnected assembly of formed metal members in frame structures comprising:

first and second members;

said first member having a first preformed hole and a first preformed collar;

said second member having a second hole;

said second hole surrounds said collar; and said collar being bent onto said second member whereby said first and second members are fastened together.

14. The invention of claim 13 wherein said second member has a second collar;

said first hole surrounds said second collar; and said second collar being bent onto said first member.

15. An interconnected assembly of metal members comprising:

first and second members;

said first member having at least a first preformed hole;

said second member having at least a first preformed collar;

said hole surrounds said collar;

tool means inserted through said hole and said collar; and said tool means causing said collar to be bent onto said first member whereby said first and second members are fastened together.

16. The invention of claim 15 wherein first member has a second hole;

said second member has a second collar;

said second hole surrounds said second collar; and said tool means causes said second collar to be bent onto said first member.

17. An interconnected assembly of metal members comprising:

first and second members;

said first member having a first preformed hole and a first preformed collar;

said second member having a second hole;

said second hole surrounds said collar;

tool means inserted through said second hole and said first collar;

and said tool means causing said collar to be bent onto said second member whereby said first and second members are fastened together.

18. The invention of claim 17 wherein said second member has a second collar;

said first hole surrounds said second collar;

said tool means inserted through said first hole and said second collar; and said tool member means causing said second collar to be bent onto said first member.

* * * * *